(12) United States Patent
Nunez et al.

(10) Patent No.: US 12,024,959 B2
(45) Date of Patent: Jul. 2, 2024

(54) ELECTRICAL SUBMERSIBLE PUMP TRANSPORT DEVICE AND METHOD THEREOF

(71) Applicant: Halliburton Energy Services, Inc., Houston, TX (US)

(72) Inventors: Xunlez Alexis Nunez, Houston, TX (US); Mengyu Zhou, Tianjin (CN); Songjing Ren, Tianjin (CN); Hans Sjerps, Amsterdam (NL)

(73) Assignee: Halliburton Energy Services, Inc., Houston, TX (US)

( * ) Notice: Subject to any disclaimer, the term of this patent is extended or adjusted under 35 U.S.C. 154(b) by 46 days.

(21) Appl. No.: 17/876,211

(22) Filed: Jul. 28, 2022

(65) Prior Publication Data
US 2023/0383614 A1 Nov. 30, 2023

Related U.S. Application Data

(63) Continuation of application No. PCT/CN2022/096291, filed on May 31, 2022.

(51) Int. Cl.
| | |
|---|---|
| *E21B 43/12* | (2006.01) |
| *B65D 85/20* | (2006.01) |
| *B65D 85/62* | (2006.01) |
| *B65D 85/68* | (2006.01) |
| *E21B 19/14* | (2006.01) |
| *F16N 31/00* | (2006.01) |

(52) U.S. Cl.
CPC .............. *E21B 19/14* (2013.01); *B65D 85/20* (2013.01); *B65D 85/62* (2013.01); *B65D 85/68* (2013.01); *E21B 43/128* (2013.01); *F16N 2031/008* (2013.01)

(58) Field of Classification Search
None
See application file for complete search history.

(56) References Cited

U.S. PATENT DOCUMENTS 2,161,402 A * 6/1939 Arutunoff .............. B65D 85/20
206/319

FOREIGN PATENT DOCUMENTS

| CH | 609631 A5 | 3/1979 |
|---|---|---|
| CN | 203079037 U | 7/2013 |

(Continued)

OTHER PUBLICATIONS

Foreign Communication from Related Application—International Search Report and Written Opinion of the International Searching Authority, International Application No. PCT/CN2022/096291, dated Feb. 24, 2023, 10 pages.

*Primary Examiner* — Bryon P Gehman
(74) *Attorney, Agent, or Firm* — Conley Rose, P.C.; Rodney B. Carroll

(57) ABSTRACT

A method of testing an electrical submersible pump (ESP) component may include placing an ESP component in a transport assembly at a first location for transport to a second location. The ESP component may be tested or maintained while the ESP component remains in the transport assembly, before being deployed at a wellsite. The ESP components can be prepared in the transport assembly to be lifted (including placement of lifting clamps) to run in hole. In various embodiment, the transport assembly may comprise the ESP component and a transport basket configured for stacking multiple transport assemblies.

20 Claims, 18 Drawing Sheets

(56) References Cited

FOREIGN PATENT DOCUMENTS

| | | | |
|---|---|---|---|
| CN | 107461341 | A | 12/2017 |
| FR | 2259027 | A1 | 8/1975 |
| JP | 2007030934 | A | 2/2007 |
| JP | 3180951 | U | 1/2013 |
| JP | 2014037243 | A | 2/2014 |
| WO | 2016028309 | A1 | 2/2016 |
| WO | 2021018793 | A1 | 2/2021 |

* cited by examiner

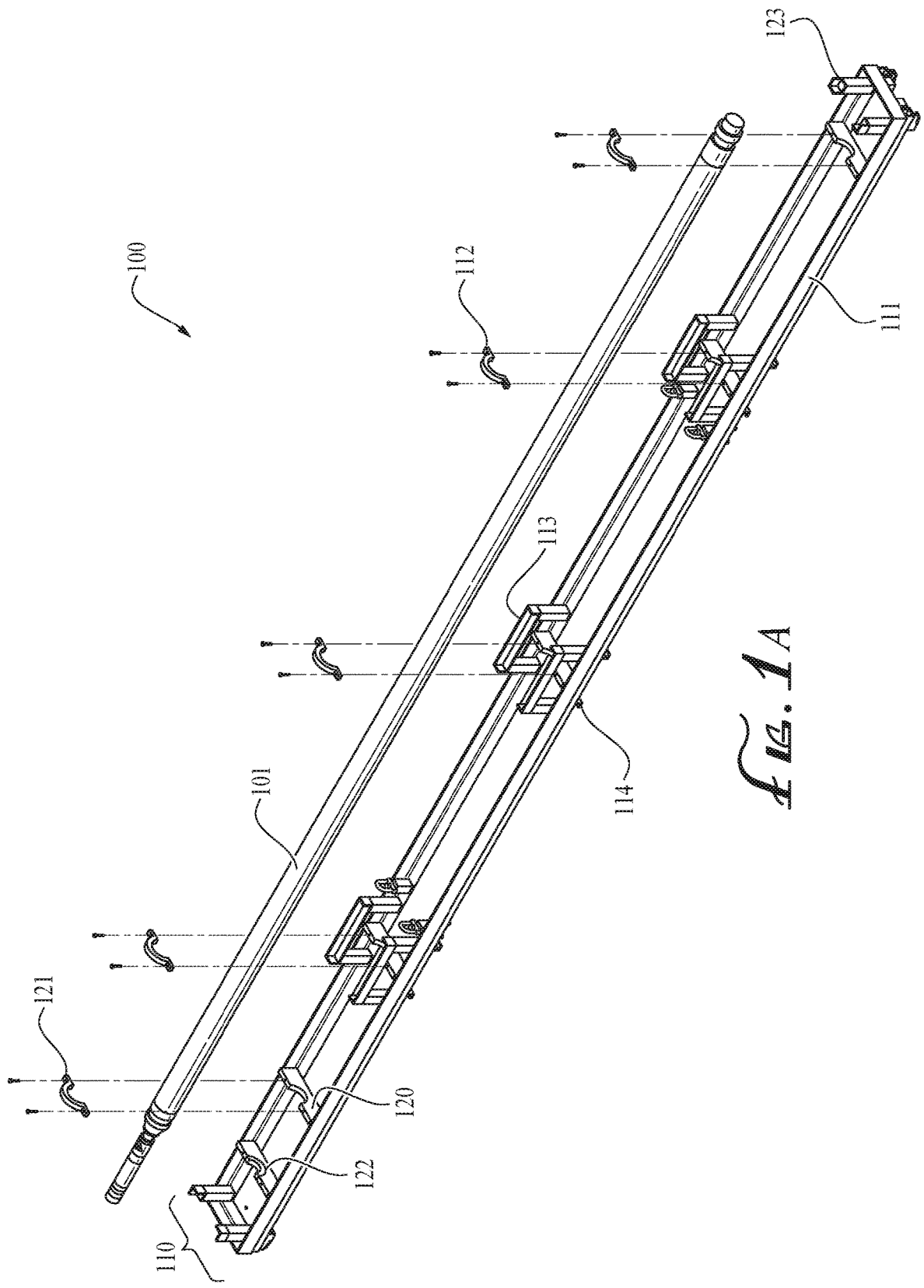

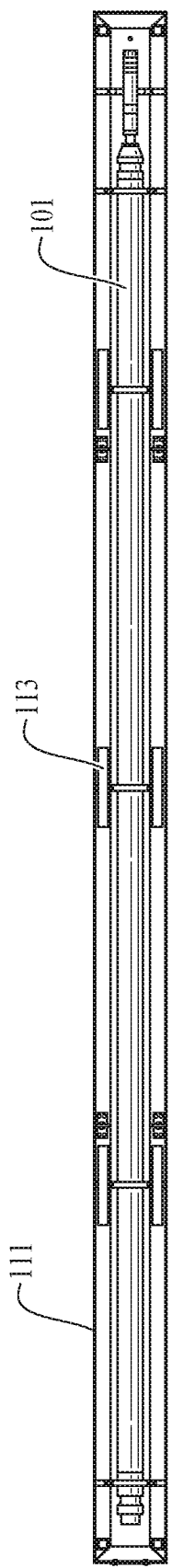
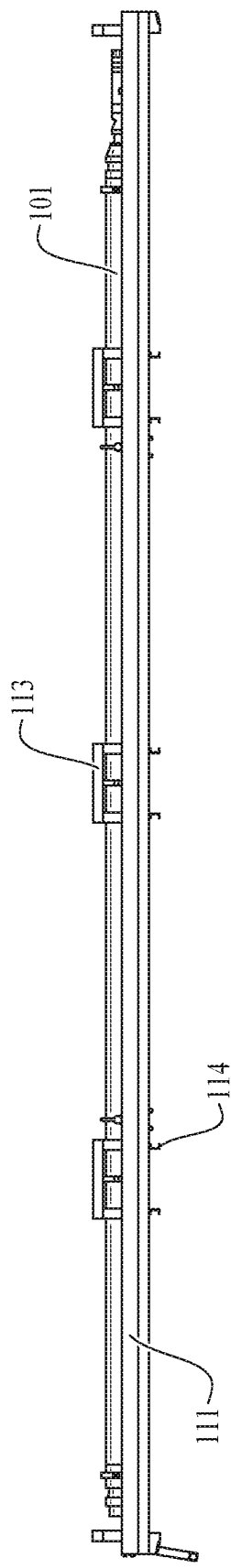
Fig. 2A
Fig. 2B

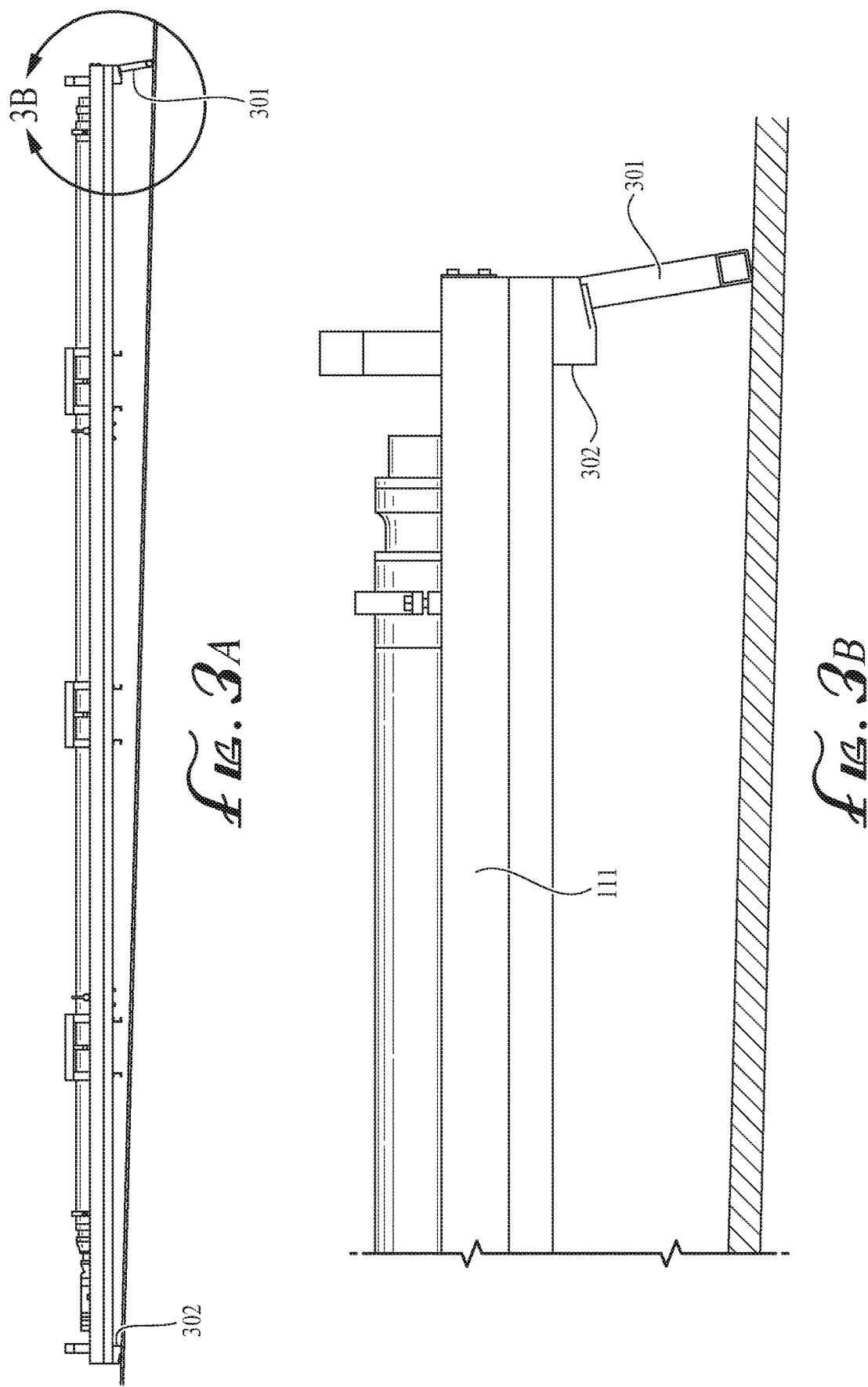

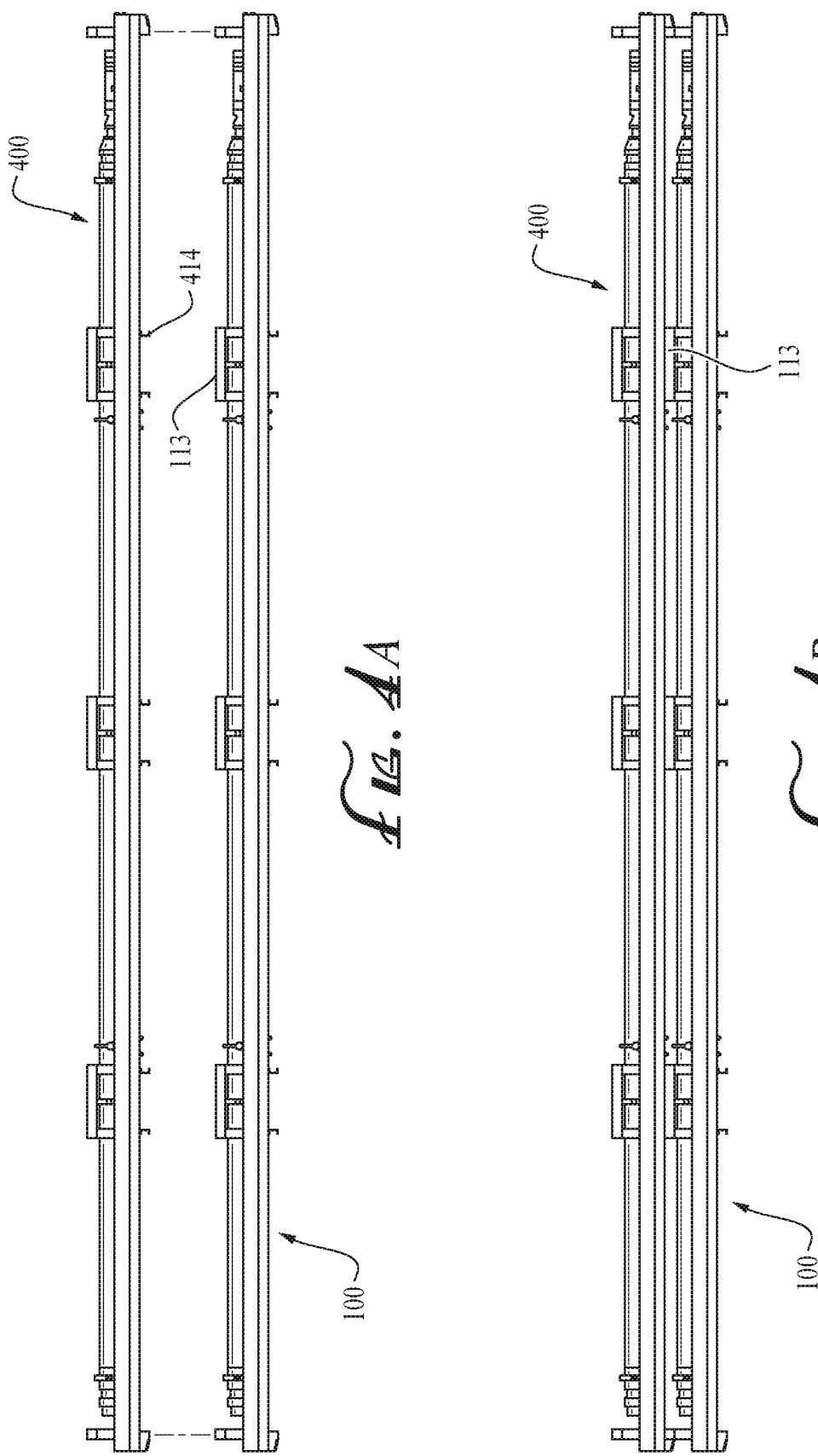

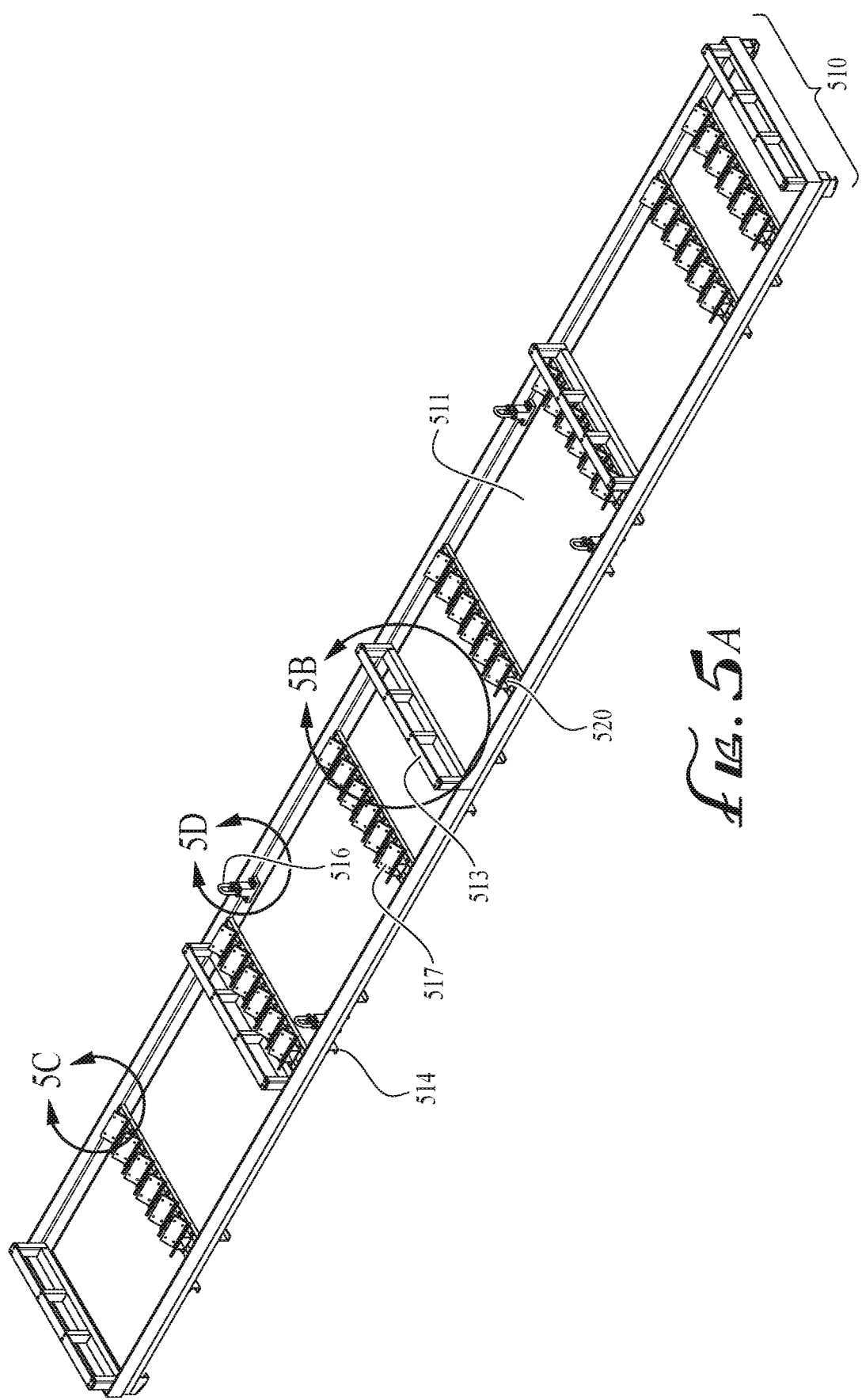

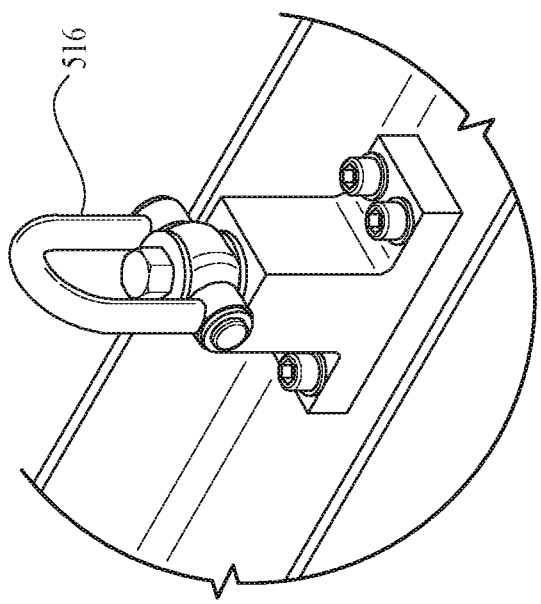
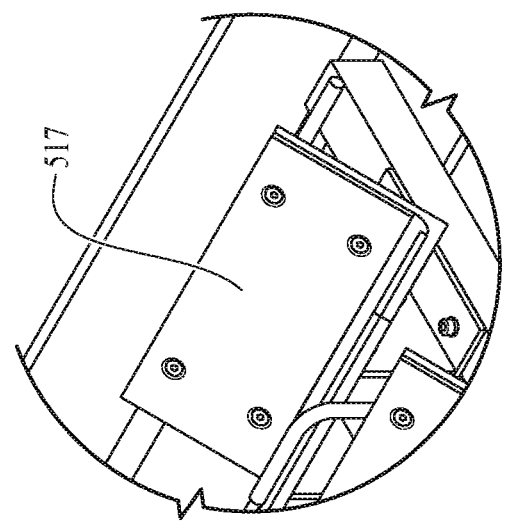
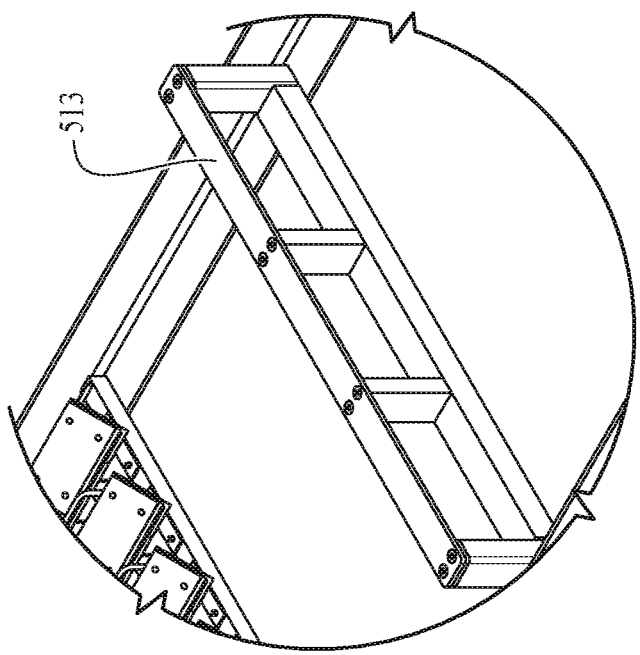

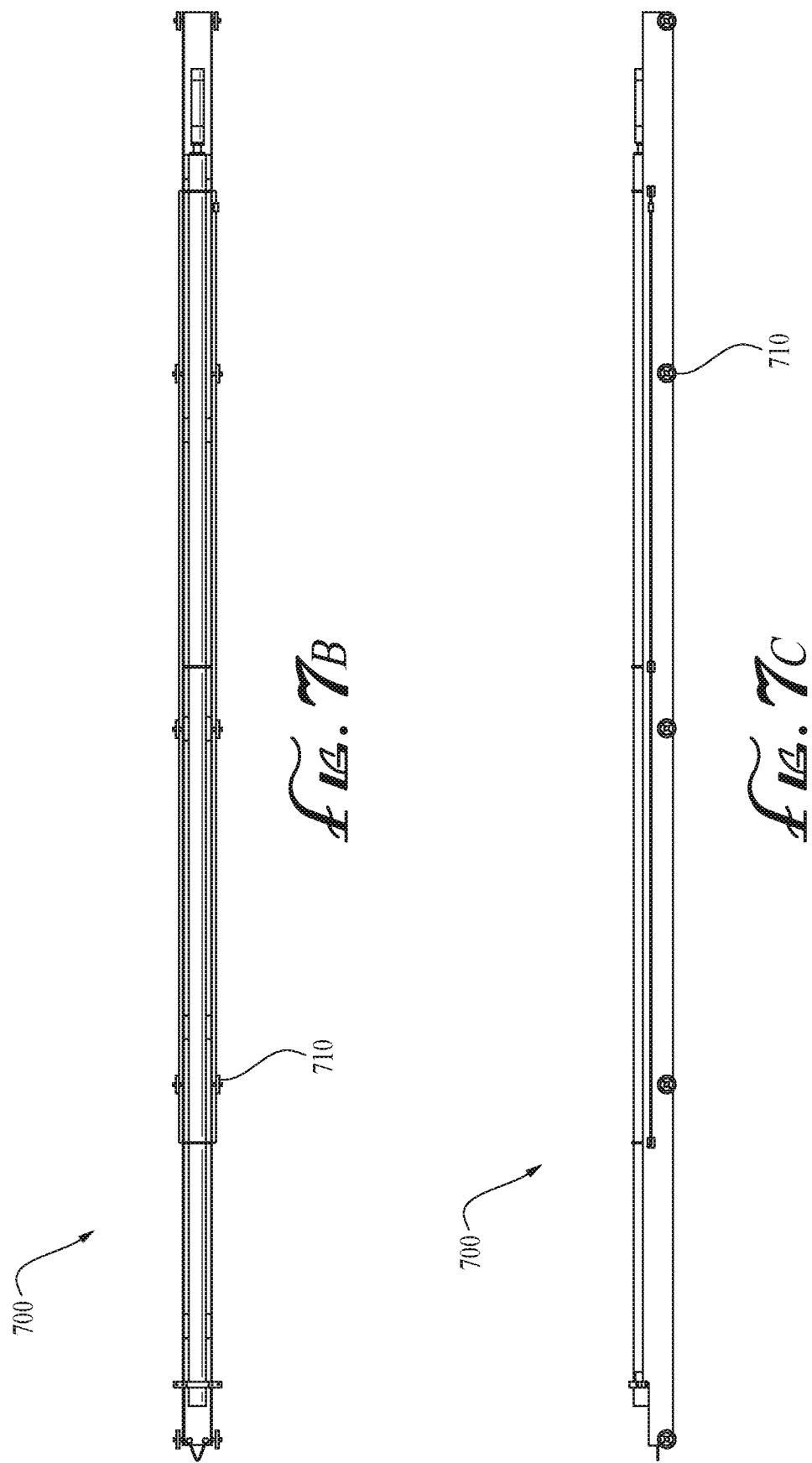

US 12,024,959 B2

ELECTRICAL SUBMERSIBLE PUMP TRANSPORT DEVICE AND METHOD THEREOF

CROSS REFERENCE TO RELATED APPLICATIONS

This application is a continuation of and claims priority to International Application No. PCT/CN2022/096291 filed May 31, 2022 and entitled, "Electrical Submersible Pump Transport Device and Method Thereof," the contents of which are incorporated herein by reference in their entirety.

BACKGROUND

Wellbore servicing tools (e.g., components of an electrical submersible pump assembly) can be prepared at a manufacturing facility and transported to a wellsite for assembly and placement downhole to perform a wellbore service or operation. Often these components can be damaged during transport. Furthermore, testing and maintenance of the components before being assembled requires multiple field service crew members and lifting the components, thereby adding time, labor, and the risk of damage. Accordingly, an ongoing need exists for an improved wellbore servicing tool transport assembly and a related method of preparing a wellbore servicing tool for transport.

BRIEF DESCRIPTION OF THE DRAWINGS

These drawings illustrate certain aspects of some of the embodiments of the present disclosure, and should not be used to limit or define the claims.

FIG. 1A illustrates an exploded view of the ESP transport assembly, in accordance with certain embodiments of the present disclosure.

FIG. 2A illustrates a top/overhead view of the ESP transport assembly, in accordance with certain embodiments of the present disclosure.

FIG. 2B illustrates a side view of the ESP transport assembly, in accordance with certain embodiments of the present disclosure.

FIG. 3A illustrates a side view of the ESP assembly in an inclined position, in accordance with certain embodiments of the present disclosure.

FIG. 3B illustrates a close-up side view of the ESP assembly in an inclined position, in accordance with certain embodiments of the present disclosure.

FIG. 4A illustrates an exploded side view of stacked ESP transport assemblies, in accordance with certain embodiments of the present disclosure.

FIG. 4B illustrates a side view of stacked ESP transport assemblies, in accordance with certain embodiments of the present disclosure.

FIG. 5A illustrates a perspective view of a transport basket configured to transport multiple ESP components, in accordance with certain embodiments of the present disclosure.

FIG. 5B illustrates a close-up perspective view of a cross-sectional brace of the transport basket shown in FIG. 5A, in accordance with certain embodiments of the present disclosure.

FIG. 5C illustrates a close-up perspective view of a support bracket of the transport basket shown in FIG. 5A, in accordance with certain embodiments of the present disclosure.

FIG. 5D illustrates a close-up perspective view of an eyebolt of the transport basket shown in FIG. 5A, in accordance with certain embodiments of the present disclosure.

FIG. 7B illustrates a top view of the ESP transport assembly of FIG. 7A, in accordance with certain embodiments of the present disclosure.

FIG. 7C illustrates a side view of the ESP transport assembly of FIG. 7A, in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only and are not exhaustive of the scope of the disclosure.

DESCRIPTION OF CERTAIN EMBODIMENTS

Figure 1B:
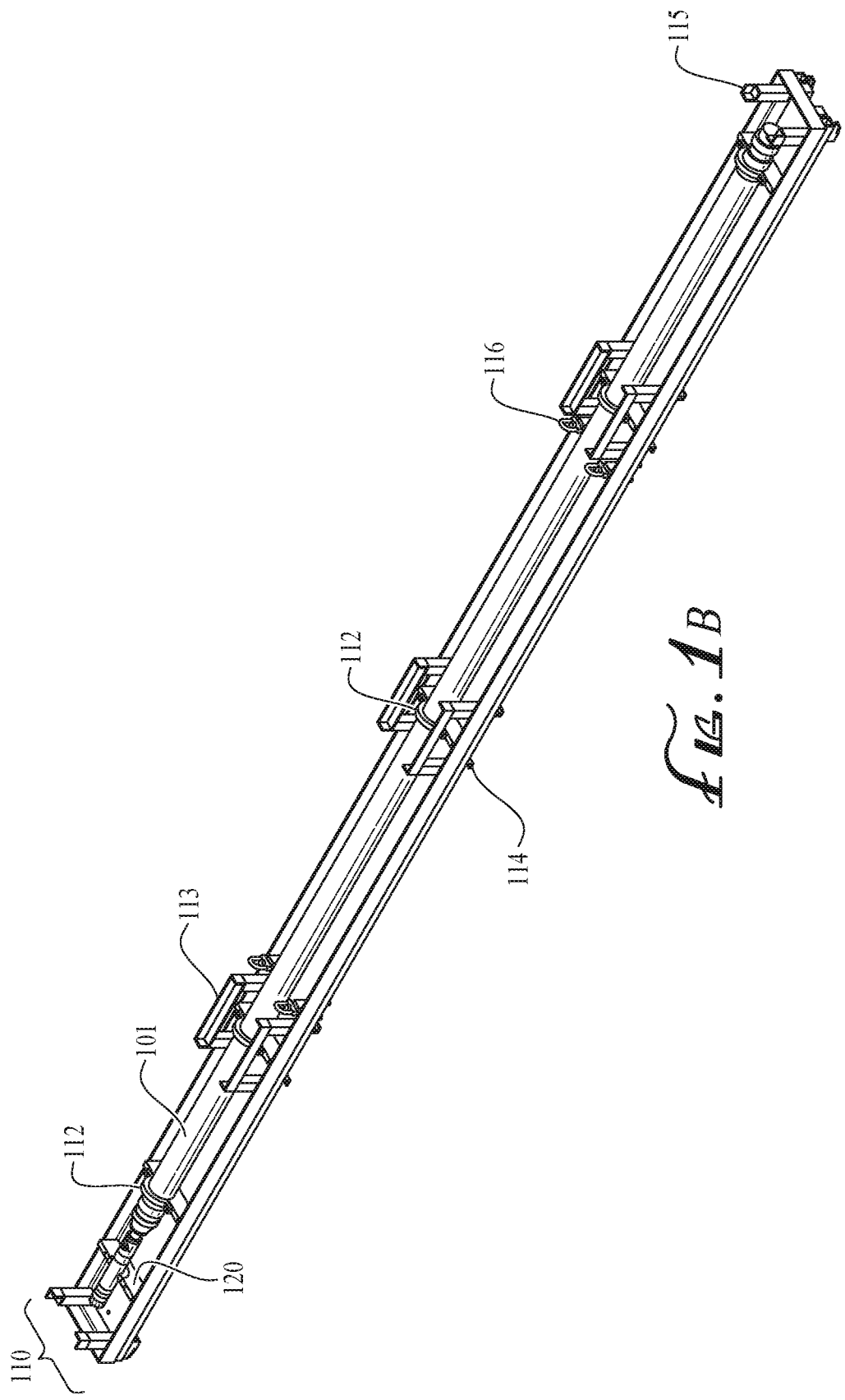
FIG. 1B illustrates a perspective view of the ESP transport assembly, in accordance with certain embodiments of the present disclosure.

Electrical submersible pumps (ESP) include multiple components, such as a motor, a pump, a seal, a gas separator, intake piece (also referred to as an inlet or fluid inlet), a discharge piece (also referred to as an outlet or fluid outlet), a sensor, and the like. These components are shipped long distances, including overseas, to a well drilling site for installation. During the shipping and storing of the ESP components, damage such as bending can occur which may short the useful life of these pieces, causing delays and added expense. In accordance with the disclosure a transport assembly can reduce the potential for damage and increase the durability of the components, as well as increasing the efficiency of testing and implementing the ESP components into operation. As shown in FIGS. 1A and 1B, an ESP transport assembly 100 comprises an ESP component 101 and a transport basket 110 (alternatively referred to as a skid). The ESP component 101 may be a motor, a pump, a seal, a gas separator, intake piece, discharge piece, sensor, or any combination thereof. A typical transport assembly is about 40 feet long, 1.8 feet wide, and 1.67 feet high, though these dimensions are merely an example. The transport assembly may be about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 feet long; 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 feet wide; and 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 feet high. The transport assembly can be any size and dimension capable of securing ESP components for transport as discussed herein. The diameter of ESP component 101 may range, for example, from 2" (inch) in diameter to 10" (inch) in diameter (e.g., 2, 3, 3, 4, 5, 6, 7, 8, 9, or 10 inch diameter). As one skilled in the art would understand, various diameters of the ESP component 101 may be included in the transport assembly 100 in addition to the given examples. The transport basket 110 is sized and reinforced to provide sufficient support and rigidity to the ESP component 101 to prevent bending or other potential damage while being transported, moved, or stored. Additionally, the transport basket is sized to facilitate proper and safe operation specially, but not limited, at rig site, in cat walk during preparation and final assembling activities as described in more detail herein.

In accordance with various embodiments, the transport basket 110 comprises a tray 111 having a bottom and four side walls, multiple clamps 112 positioned along the length of the tray to secure the ESP component 101, a plurality of upper braces 113 connected to the sides of the tray 111, and at least two lift 114 supports connected to the underside of the bottom of the tray 111. The example also includes vertical bracing structures 115 at the four corners of the transport basket 110. The four side walls of the tray 111 include two end walls and two lengthwise side walls. The tray 111 is configured to collect any oil leakage or oil drop from the ESP component 101 during transportation, storage, oil sampling, flushing, equipment precheck or run in hole preparation.

In accordance with various embodiments, each clamp 112 has a bottom component 120 and a top component 121. The two components 120, 121 are shaped to secure the ESP component 101. As shown in FIGS. 1A-2C, the clamps 112 are spaced along the length of the transport basket 110 to secure and support the entire ESP component 101. The clamps 112 can be aligned at the same point as the braces 113 and the lift supports 114. In other various embodiments, the clamps 112 are not aligned with the braces 113 and the lift supports 114. The clamps 112 are sized to provide support to whatever the diameter of the ESP component 101 is at the clamping point, which may differ along the length of the ESP component 101. For example, FIGS. 1A and 1B show an exemplary ESP transport assembly 100 with six clamping points. Five of the clamps 112 are sized the same to secure the same diameter along the ESP component 101. A sixth clamp point 122 shown at the far end of the transport assembly 100, illustrates a bottom component 120 of a clamp 112 with a relative smaller diameter to be in secure contact with the narrower diameter of a sensor of the ESP component 101. Additionally, as shown in FIG. 1A, the top component 121 of the clamp 112 is removable and can be fastened to the bottom component 120. The top component 121 can be fastened using bolts, screws, a hinged locking mechanism, or any other fastener as would be known by one skilled in the art. Clamps may be replaced by "V"shaped brackets to improve diameter flexibility (such as cross-piece support 520 in FIG. 5A discussed below) in this case ratcheted straps are used to secure the ESP components.

In various embodiments, the transport basket 110 comprises lift supports 114, such as u-channels or c-channels for example, to facilitate lifting the transport assembly 100 by forklift. The lift supports 114 can be spaced and sized for a typical fork of the fork lift forks to be inserted for safer and proper maneuvers. The lift supports 114 are attached to the underside of the tray 111.

Figure 4C:
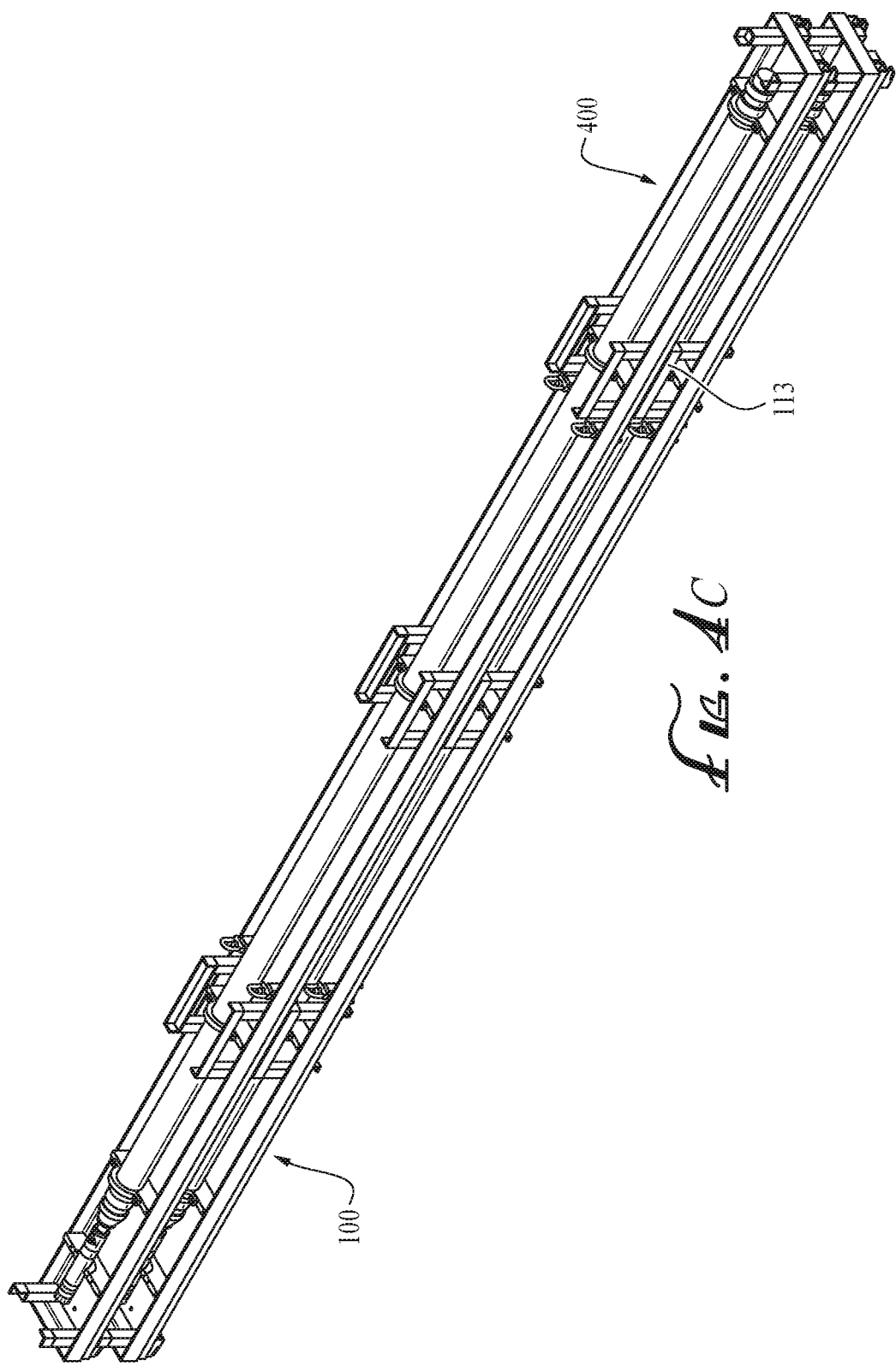
FIG. 4C illustrates a perspective view of stacked ESP transport assemblies, in accordance with certain embodiments of the present disclosure.
Figure 4D:
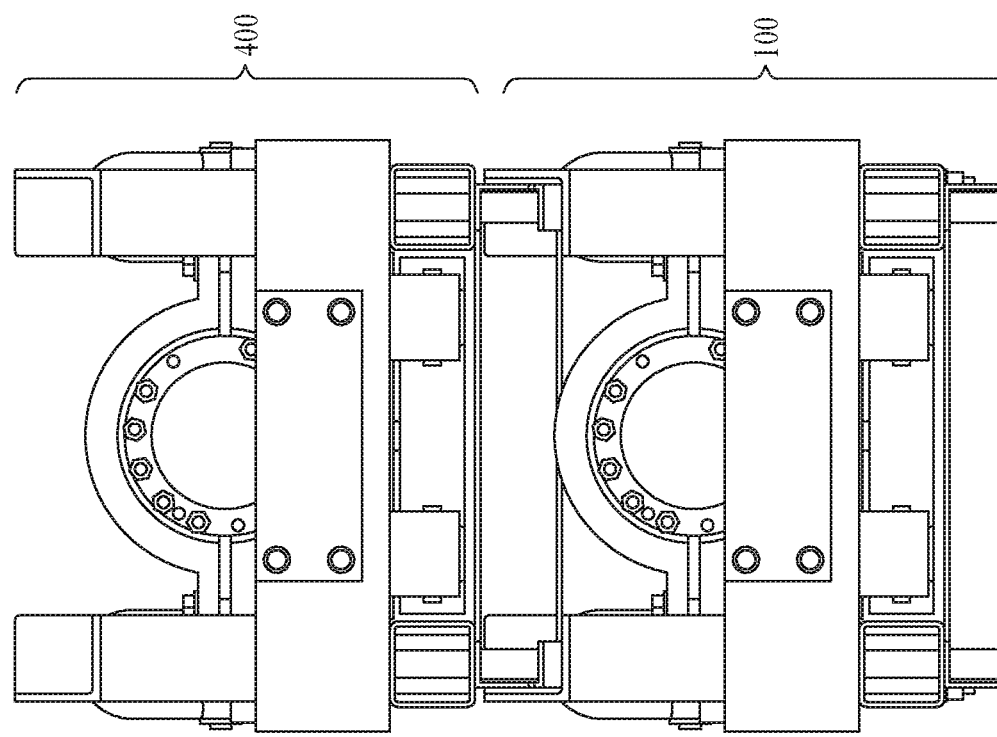
FIG. 4D illustrates an end view of stacked ESP transport assemblies, in accordance with certain embodiments of the present disclosure.
Figure 4E:
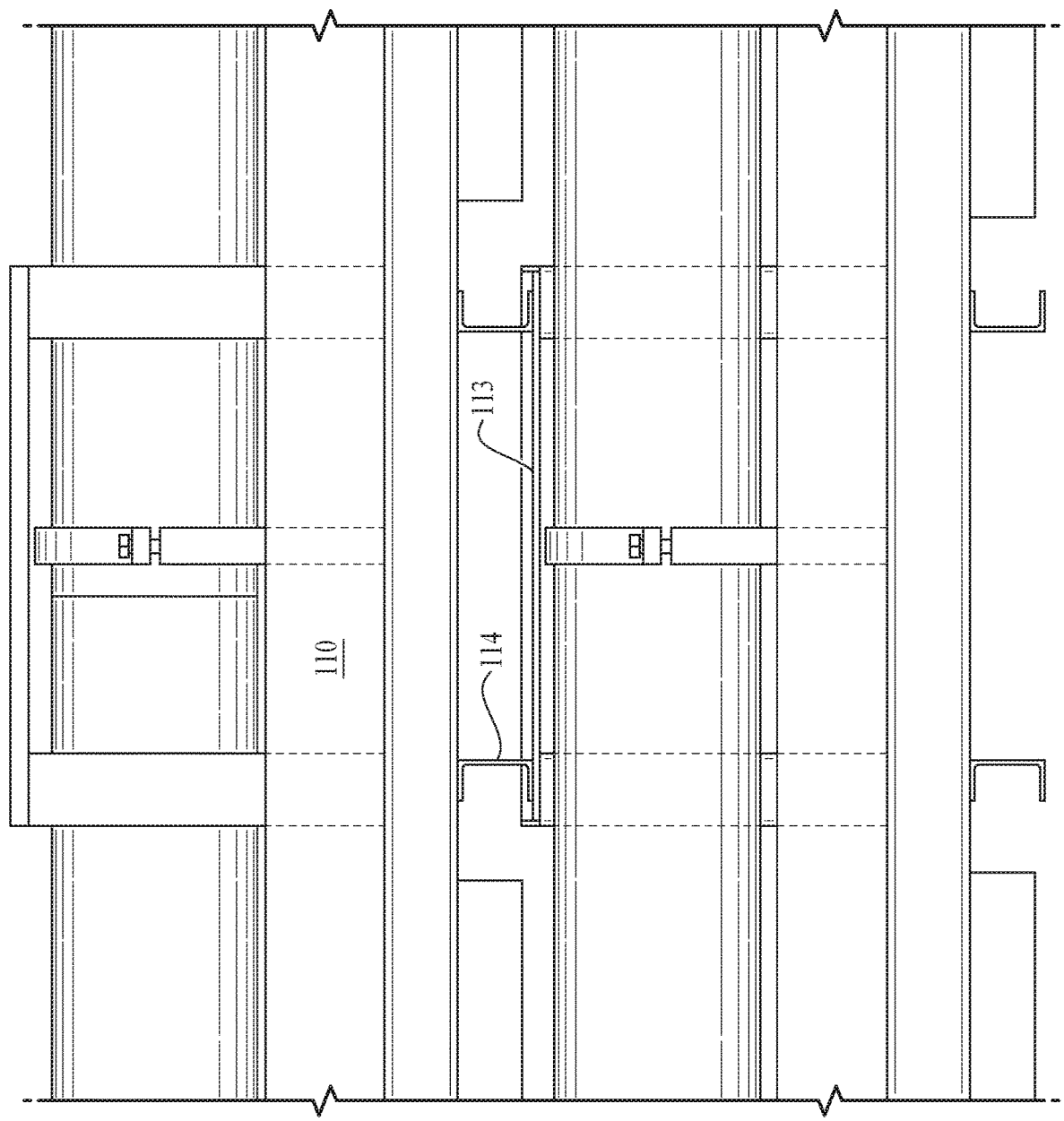
FIG. 4E illustrates a side view of stacked ESP transport assemblies, in accordance with certain embodiments of the present disclosure.
Figure 4F:
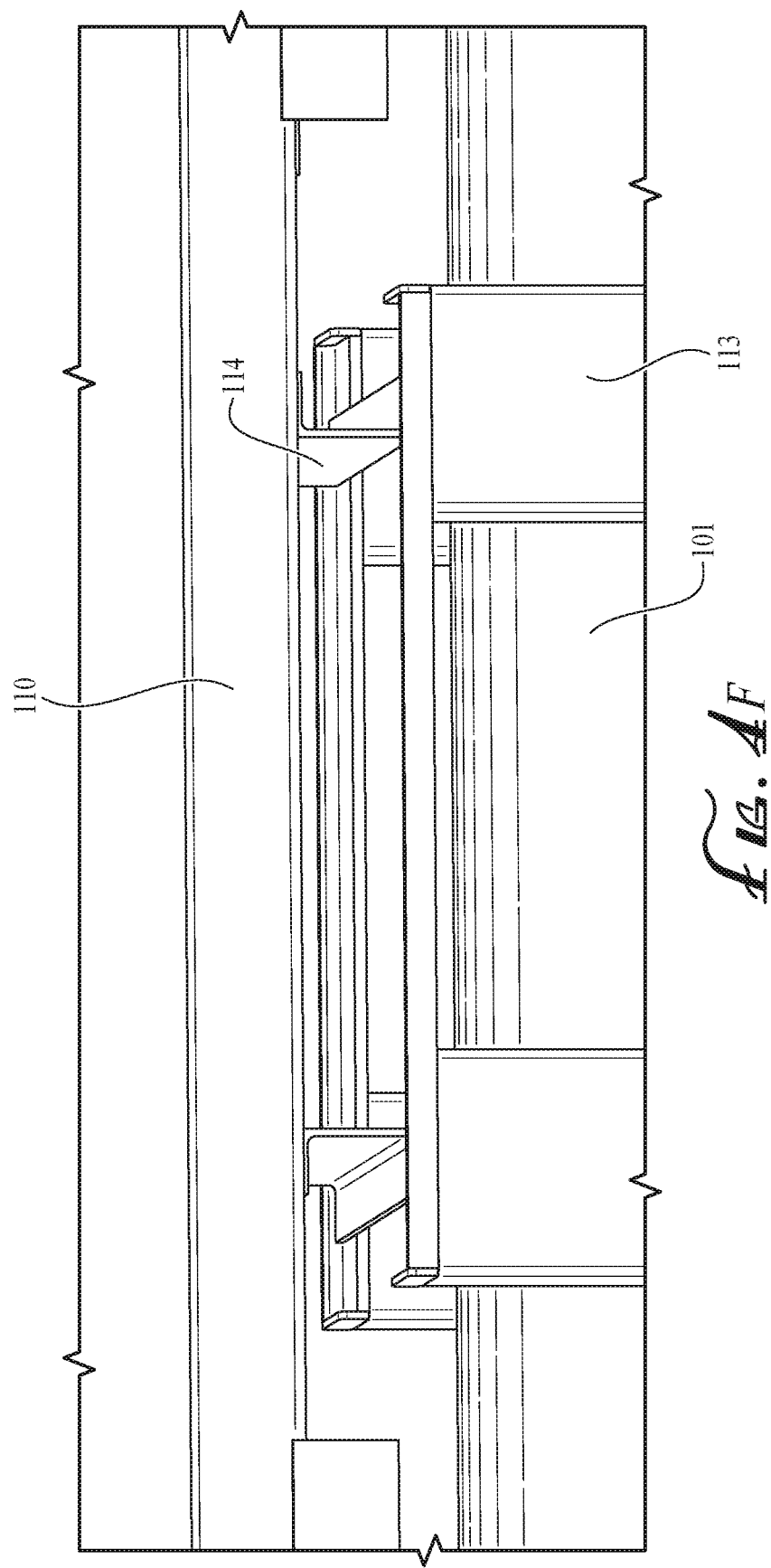
FIG. 4F illustrates an isometric side view of stacked ESP transport assemblies, in accordance with certain embodiments of the present disclosure.
Figure 6A:
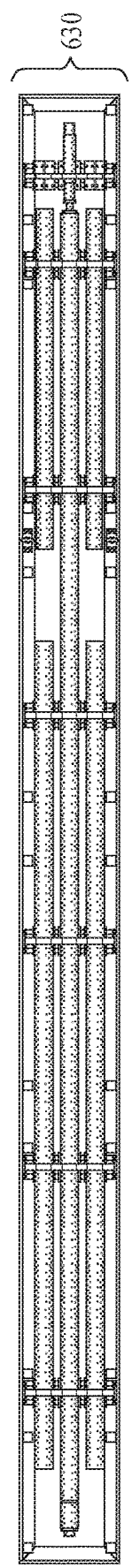
FIG. 6A illustrates an overhead view of a first ESP transport assembly having multiple ESP components, in accordance with certain embodiments of the present disclosure.
Figure 6B:
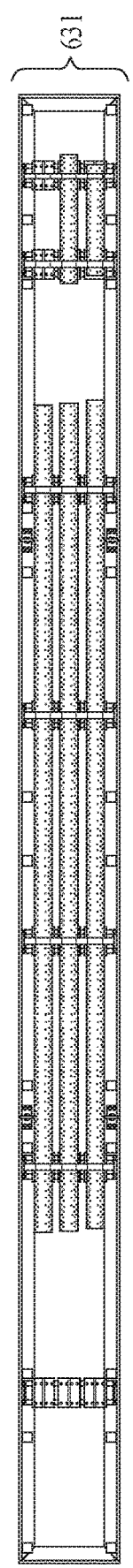
FIG. 6B illustrates an overhead view of a second ESP transport assembly having multiple ESP components, in accordance with certain embodiments of the present disclosure.
Figure 6C:
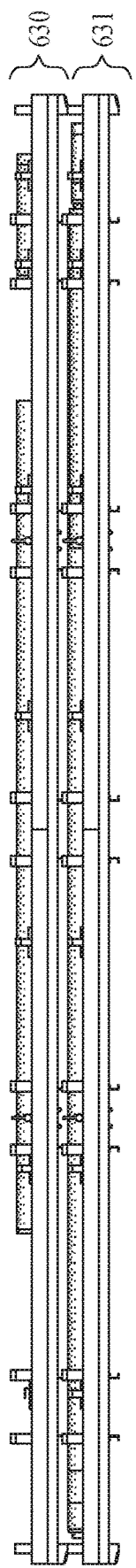
FIG. 6C illustrates a side view of the ESP transport assemblies of FIGS. 5A-5B in a stacked configuration, in accordance with certain embodiments of the present disclosure.
Figure 6D:
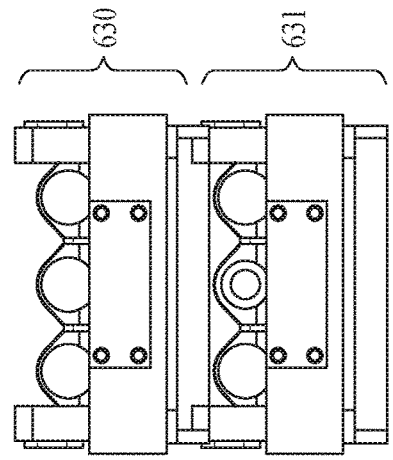
FIG. 6D illustrates an end view of the ESP transport assemblies of FIGS. 5A-5B in a stacked configuration, in accordance with certain embodiments of the present disclosure.

In addition, braces 113 on located on top of the transport basket 110 and attached to lengthwise side walls of the tray 111. The braces 113 are designed to form a connection with the lift supports 414 of a second transport assembly 400 when stacking multiple transport assemblies for storage and transport, as illustrated in FIGS. 4A-4D for example. Further, as shown in FIG. 2A, the braces 113 are parallel to each other along the tray side walls to enable lowering and raising the ESP component 101 in and out the transport assembly 100. In one embodiment, the braces 113 have a width slightly narrower than the inner span of the lift supports 114 such that the braces can fit inside the lift supports 114 of a second transport assembly 100. In another embodiment, the lift supports 114 are shorter than the width of the transport basket 110 such that the lift supports 114 can fit within the braces 113 of a second transport assembly 100, as shown in FIGS. 4A-4C. As shown in FIGS. 4E-4F, various embodiments may have a notched gap in the side wall of the transport basket 110, such that the lift supports 114 are accessible for a forklift. In this embodiment, the braces 113 of a lower transport assembly are in with the lift supports 114 of an upper transport assembly. The lifts supports 114 rest inside the braces 113 when stacking multiple transport assemblies, leaving the lift supports 114 accessible and still provide structural support for the stacked transport assemblies.

Figure 2C:
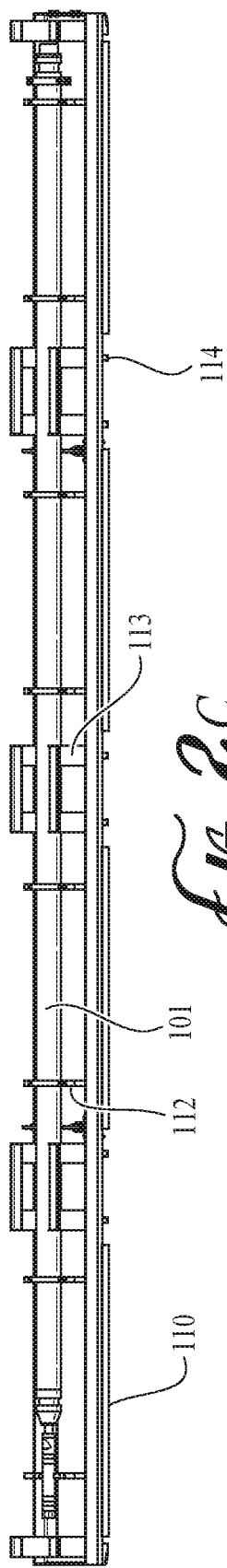
FIG. 2C illustrates a side view of the ESP transport assembly, in accordance with certain embodiments of the present disclosure.
Figure 2D:
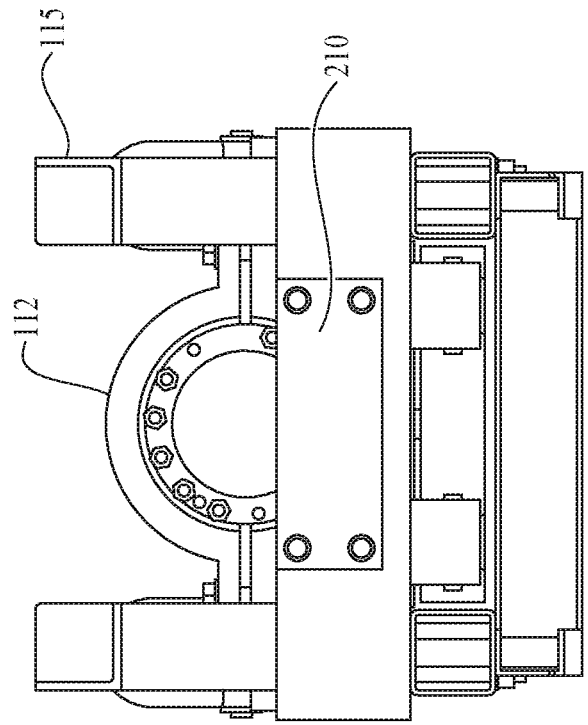
FIG. 2D illustrates an end view of the ESP transport assembly, in accordance with certain embodiments of the present disclosure.

In various embodiments and with reference to FIG. 2D, one or more end walls of the transport basket 110 comprise a removable plate 210 to facilitate the removal of a head shipping cap. The removable plates 210 can be located in each end of the transport basket 210 to facilitate the caps removals for pre-check, maintenance, and pre-run preparation activities.

In various embodiments and with reference to FIGS. 1A-1B, the transport basket 110 can further comprises eyebolts 116 located along the transport assembly, preferably with the eyebolts oriented vertically on the assembly. Preferably, the eyebolts 116 are located within the outer edges of the transport basket 110 in order to minimize the assembly width for more compact stacking and shipping of the transport assemblies 100. In one embodiment, the transport assembly 100 comprises four swivel eyebolts 116 evenly spaced for a 4-point sling. Specifically, a first pair of eyebolts 116 can be located parallel to each other a distance from the first end, and a second pair of eyebolts 116 located parallel to each other the same distance from the second end. The distances of the eyebolts 116 being the same provides for balance of the transport assembly 100 when being lifted using a 4-point sling.

Figure 3C:
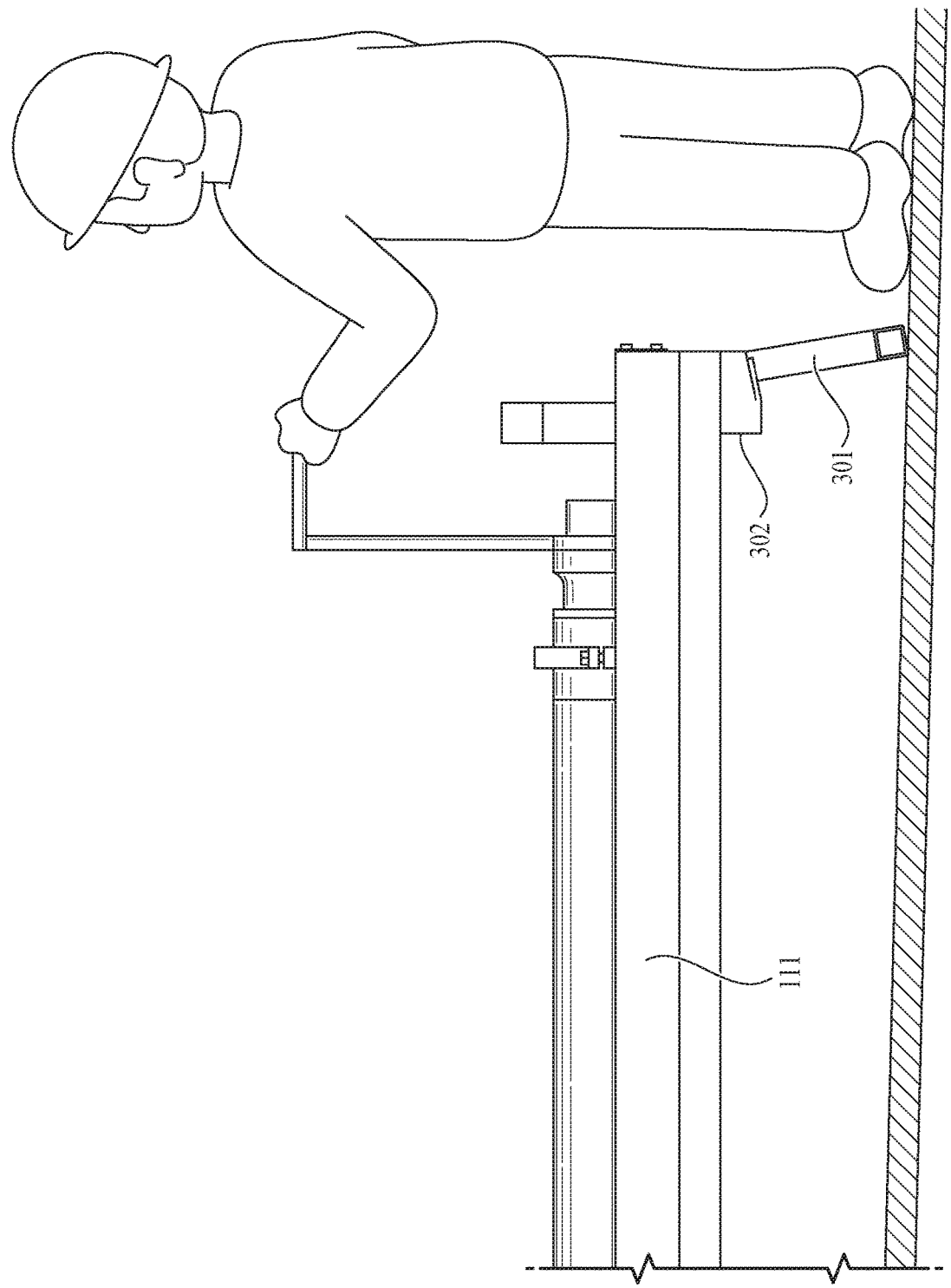
FIG. 3C illustrates a person preparing an ESP component still in the ESP transport assembly, in accordance with certain embodiments of the present disclosure.

Further embodiments include a drain hole at one end of the tray 111, with a drain plug. In one embodiment and as illustrated in FIGS. 3A-3B, the transport basket 110 further comprises a rotatable support 301 at a first end, and the drain hole and plug located at a second end of the basket, wherein the first end is opposite the second end of the basket. The rotatable support 301 (also referred to as a lift assembly) can be lowered into an extended position in order to elevate the first end of the ESP transport assembly 100, such that the first end is elevated relative to the second end. The drain hole allows draining of any fluid from the basket, such as rain water that may collect or any fluids that can be cleaned from the tray. In accordance with various embodiments, the ESP transport basket 110 further comprises at least one angled support 302 connected to bottom of the tray at the second end. The at least one angled support 302 provides more surface area for stability when the transport assembly is in the elevated position using the rotatable support 301. In various embodiments, the rotatable support 301 is positioned parallel to the tray 111 in a stored position and can be manually rotated into an angled position. In other embodiments, the rotatable support 301 can be extended into the angled position using a hydraulic jack or similar to raise the transport assembly 100. The rotatable support 301 can comprise a jack, a hydraulic cylinder, a scissor lift, a pivoting support member, or a combination thereof.

Additionally, in various embodiments, testing and preparation of an ESP component, such as a motor, can take place while the motor is still secured to the transport basket. For example, and with reference to FIG. 3C, testing and maintenance can include rotating an internal component of a motor while the motor remains in the transport assembly using a manual lever or powered device to rotate and test.

Figure 1C:
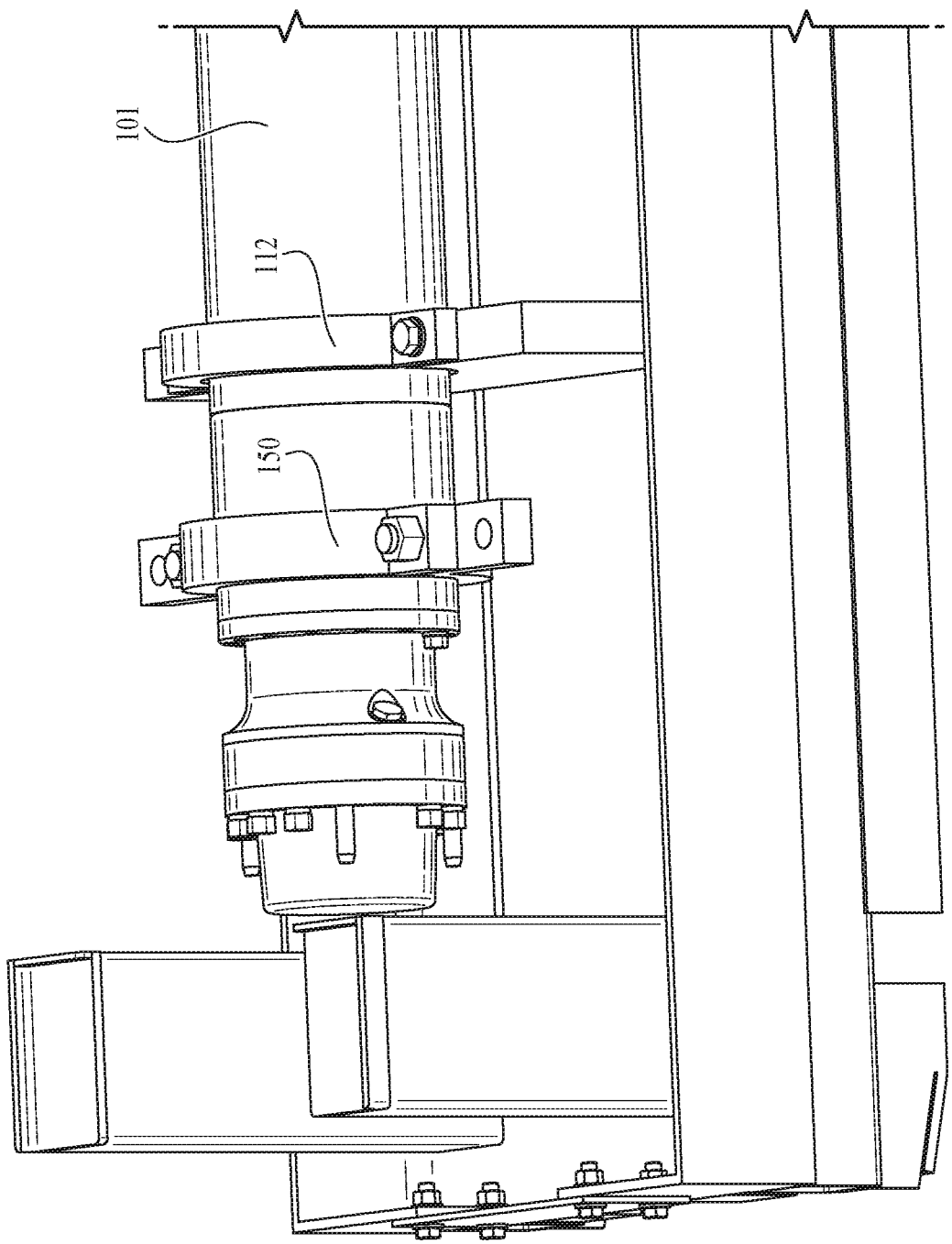
FIG. 1C illustrates a perspective view of the ESP transport assembly with a lifting clamp attached to the ESP component, in accordance with certain embodiments of the present disclosure.

In various embodiments, the side walls of the transport basket 110 are no higher than the middle of the ESP component 101 in the clamped position. This enables access to the ESP component 101 while still secured in the transport assembly. In addition to securing the ESP component 101, the clamps 112 position at least half the ESP component 101 above the tray's 114 side walls and below the top of the braces 113. Access to the ESP component 101 in the clamped position allows for testing and preparation for the next steps without removing the ESP component 101 from the transport assembly 100. For example, next steps may include affixing one or more lifting clamps while the ESP component 101 is still secured in the transport basket 110. FIG. 1C illustrates a lifting clamp 150 secured to the ESP component 101 while still in the transport assembly. Thus, a worker is able to place the lifting clamp around the ESP component 101 while still secured in the transport basket 110 because the ESP component 101 is held in position between the tray side walls and the tray bottom. Lifting clamps 150 may be included on any of the ESP components shown in the various figures, including the wheeled transport assemblies shown in FIGS. 7A-7C and/or the multi-row transport assemblies shown in FIGS. 5 and 6 that are configured to transport a plurality of ESP components (wherein each ESP component may comprise lifting claims 150 to allow for lifting of the ESP component directly from the transport assembly at a lifting location such as a catwalk during assembly for run-in the wellbore). In an aspect, the lifting claims 150 are attached to the ESP components by a worker while the ESP component remains in the transport assembly positioned at the lift location such as a catwalk.

Additionally, in various embodiments, the transport assembly 100 further comprises reflective strips located in corners of the transport basket 110 to increase visibility and facilitate night movement. The transport assembly may also include shock washers located at 90 degrees from each other in at least two different sides to cover the three axes in order to monitor impact to the transport assembly 100. Synthetic fabric cover may be added and designed to protect transport assembly 100 from environment in open storage situation. Synthetic fabric can help keep rain water out of the tray of the transport assembly. The cover can be fit to structure main body allowing stacking and lifting.

In addition to the transporting of a single ESP component, such as a motor and sensor, as discussed above, a transport assembly can be configured to transport multiple ESP components. In accordance with various embodiments and with reference to FIGS. 5A-5D, a multi-row transport basket 510 can transported a plurality of ESP components. Similar to transport basket 110, the transport basket 510 is sized and reinforced to provide sufficient support and rigidity to multiple ESP components to prevent bending or other potential damage while being transported, moved, or stored. The transport basket 510 is similar to the transport basket 110 in various aspects and reference is made to those aspects discussed above.

As shown in FIG. 5A, the transport basket 510 may comprise a tray 511 having a bottom, two end walls, and two lengthwise side walls. In various embodiments, the transport basket 510 further comprises a plurality of cross-piece supports 520 positioned width-wise between the two lengthwise side walls. Each cross-piece support 520 comprises multiple brackets 517 (close-up view shown in FIG. 5C). The brackets 517 can be different shapes, such as the open "V"-shape shown, or other shapes such as U-shaped, C-shaped, arced, arched, semi-circular, and may comprise an elastic layer, such as rubber liner, to protect the equipment during placement and transport. In an aspect, a lower portion of the cross-piece support may be a cradle (e.g., semi-circular cradle) for receiving and supporting an ESP component, and the cradle may comprise an upper portion configured to attach (e.g., bolt or latch) to the lower portion to secure the ESP component within the cradle. The size, shape, number, or position of the cross-piece supports 520 can be selected and configured to provide support for a plurality of ESP components having different diameters and heights while keeping the transport assembly supported, leveled and straight (e.g., multiple diameters and/or multiple size of cross-piece supports to keep always the center of the transport assembly aligned and leveled). In an aspect, a single cross-piece support 520 may accommodate a plurality of ESP components positioned side-by-side and having different diameters, for example by having a corresponding plurality of brackets 517 positioned side-by-side across the width of the cross-piece support 520 and configured to accommodate ESP components of differing diameters. Additionally, or alternatively, a plurality of cross-piece supports 520 may be spaced a distance apart along the length of the transport basket 510, as shown in FIG. 5A, and each of the plurality of cross-piece supports 520 can accommodate an ESP component having a uniform or differing diameters along a length thereof, for example by having a corresponding plurality of brackets 517 aligned axially along a length of the ESP component and configured to accommodate an ESP component having differing diameters along a length thereof (for example, as shown by the middle ESP component of FIG. 6A having a smaller diameter at one end thereof).

For example, FIG. 5A shows seven cross-piece supports 520, each having six brackets 517 and configured to secure multiple components in an ESP transport assembly, and reduce vibration. The ESP components can be secured to the cross-piece supports 520 using clamps, ratchet straps, various fasteners, or a combination thereof. The transport basket 510 further comprises braces 513 (close-up view shown in FIG. 5B) that provide support and spacing for the transport basket 510, plus being configured for attaching the transport basket 510 to a second transport assembly. Similar to the transport basket 110, transport basket 510 also comprises lift 514 supports connected to the underside of the bottom of the tray 511, and eyebolts 516 (close-up view shown in FIG. 5D) located along the transport assembly. The lift supports 514 are similar to lift supports 114 as described above, and the eyebolts 516 are similar to eyebolts 116 as described above.

FIGS. 6A-6D illustrate two transport assemblies each having a multi-row transport basket and carrying multiple ESP components, which can be stacked. In various embodiments and with reference to FIGS. 6A-6D, for efficiency in the field, the ESP components in each transport basket are selected and grouped such that the ESP components needed for assembling the ESP for run-in are in the same transport assembly. For example, transport assembly 630 comprises a transport basket and the ESP components including a motor and sensor (middle ESP component), two pumps (left side upper and lower ESP components), and two seals (right side upper and lower ESP components). Likewise, transport assembly 631 comprises a transport basket and the ESP components including two pumps (upper and lower center ESP components), a gas handler pump (middle center ESP component), and two gas separators (right side middle and lower ESP components). The grouped ESP components allow for efficient transport and assembly. In practice, the ESP components in the transport assembly 630 are transported first to a workover or drilling rig catwalk for use, all components in the first basket are assembled, and then additional components, such as the ones in transport assembly 631, are transported to the catwalk until the ESP assembly is completed.

In addition to the example given above, various combinations of ESP components can be transported in multi-row transport basket. The various combinations can vary based on components needed for different drilling operations and locations, weight distribution requirements, and different sizes of components. In various embodiments, the cross pieces and corresponding brackets, such as cross-piece support 520 and multiple brackets 517, are customizable for the various combinations. In one embodiment, the customization may take place during fabrication of the transport basket. In another embodiment, the cross pieces and corresponding brackets can be placed and replaced as needed to accommodate the different component sizes.

Figure 7A:
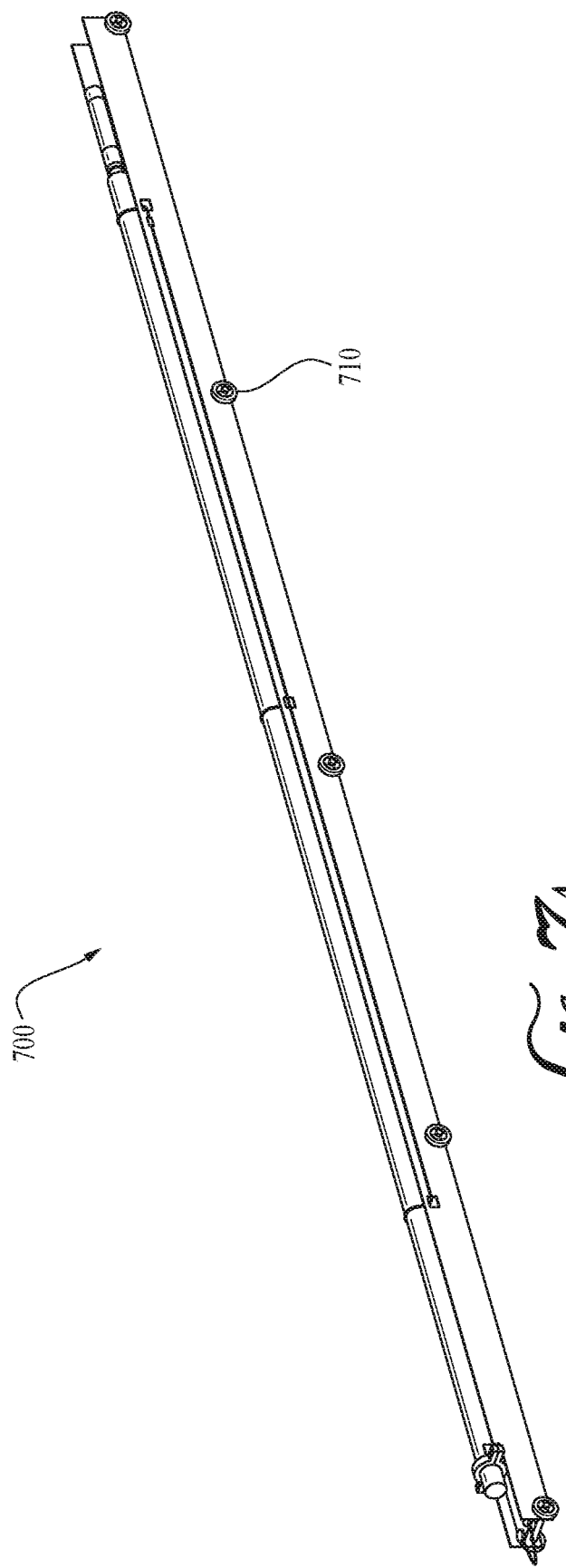
FIG. 7A illustrates a perspective view of an ESP transport assembly, in accordance with certain embodiments of the present disclosure.

FIGS. 7A-7C illustrate an ESP transport assembly 700 similar to transport assembly 100, but with the transport assembly further comprising wheels 710 in accordance with various embodiments. The ESP transport assembly 700 having wheels 710 allows the transport assembly to be pulled along for relocating, rather than use of a crane or other device. For example, the ESP transport assembly 700 may be pulled along a catwalk up to a ramp for long motor installation, thereby avoiding bending and facilitating assembly procedure and lifting. The wheels 710 can be locked during transportation and storage. While in a catwalk, the wheels 710 may be released to facilitate positioning of the ESP transport assembly 700, avoiding additional lifting and optimizing placement. The ESP transport assembly 700 may be used in locations with limited dual lifting capabilities. Wheels 710 as shown in FIGS. 7A-7C may be included with any of the other transport assemblies described herein, including those shown in FIGS. 1-6.

In an aspect, a plurality of ESP components are loaded into baskets 110/510 of the type described herein to provide any of the transport assemblies of FIGS. 1-7, transported to a wellsite (for example by truck and trailer), offloaded at the wellsite (for example by a forklift and placed at a lift location such as a rig catwalk), and the ESP components are tested as described herein (e.g., electrical or mechanical testing), maintained as described herein (e.g., check or add oil), and/or prepared for assembly and run-in as described herein (e.g., lifting clamps added at the lift location such as a catwalk) while the ESP components remain in the transport assembly (e.g., in an about horizontal position relative to the catwalk) and prior to lifting of the ESP components from the transport assembly and placement thereof into a vertical position for attachment/make-up of the ESP assembly during assembly and run-in. After testing, maintenance, and/or preparation for run-in, the ESP assemblies are unlatched (released, unclamped, unsecured) from the basket 110/510 (e.g., the upper/top component 121 of clamps 112 are removed), and the ESP components are lifted from their horizontal position in the basket and placed into a vertical configuration and connected in a desired/designated sequence to form/make-up the ESP assembly during run-in the wellbore. Upon removal of the ESP assembly from the transport assembly (e.g., the basket 110/510 as described herein), the empty basket 110/510 can be removed from the wellsite (e.g., loaded back onto the trailer via a forklift or crane) and transported away from the wellsite (e.g., back to a manufacturing, storage, or maintenance location) where the basket 110/510 may be again loaded with ESP components to form a transport assembly as shown in any of FIGS. 1-7.

In accordance with various embodiments, a method of transporting an ESP component may comprise placing an ESP component in a transport assembly of any of FIGS. 1-7, alternatively referred to as a skid or basket of the type described herein, at a first location; transporting the transport assembly to a second location; and testing, maintaining, or preparing the ESP component for assembly and run-in while the ESP component remains in the transport assembly. The first location may be any one of a manufacturing location, a servicing location, a storage location, a staging location, an operations base, a regional office, a field office, a customer location or premises, an equipment yard, a worksite, a job site, a wellsite and the second location is any one of a manufacturing location, a servicing location, a storage location, a staging location, an operations base, a regional office, a field office, a customer location or premises, an equipment yard, a worksite, a job site, a wellsite, where the first location and second location are different. Transporting the transport assembly may further comprise loading the transport assembly onto a vehicle, aircraft, helicopter, barge, or ship and moving the ESP components from the first location to the second location. The second location is proximate a wellsite, for example.

In various embodiments, the method further includes removing the ESP component from the transport assembly; and placing the ESP component in a wellbore at the wellsite. In one example, the transport assembly is removed from the vehicle, aircraft, helicopter, barge or ship and placed the transport assembly at a lift location at the wellsite prior to testing the internal component of the ESP component. The vehicle may be a commercial truck configured for transit on public highways, for example a semi-truck and trailer wherein the transport assembly is secured to the trailer during transport. In addition, the lift location may be a catwalk or loading area of a drilling rig or workover rig, where the rig may be located onshore or offshore.

As discussed with above, the ESP component may be inclined using rotatable support 301 to lift and support an end of the transport assembly to provide an inclined transport assembly prior to the testing, maintaining, or preparing. The lifting and supporting an end of the transport assembly may further comprise actuating a lift assembly coupled to the bottom of the transport assembly. The lift assembly can be a jack, a hydraulic cylinder, a scissor lift, a pivoting support member, or a combination thereof.

In various embodiments, the testing, maintaining, or preparing discussed above can include the following:
 a. checking, sampling, or flushing oil of the ESP component;
 b. checking a mechanical connection of the ESP component, for example removing the end cap of the ESP component to provide an exposed end connector and checking the exposed end connector (e.g., a threaded connector, a flange, a latch, a seal, a gasket, etc.) for possible damage; or
 c. checking an electrical and electronic ESP component, such as a motor or a sensor, for example by one or more of the following: connecting a power supply to the electrical or electronic ESP component, powering up or energizing the electrical or electronic ESP component, establishing signal communication with the ESP component, or performing one or more diagnostic tests or system checks on the powered ESP component; or
 d. placing lifting clamps on the ESP component and completing the preparation to run in hole while in the transportation assembly, wherein the ESP component is lifted direct from the transport assembly to a well.

For example, checking an electrical or electronic ESP component may include removing a protective cover such as an end cap or motor pothead from either or both ends of the ESP component to access one or more electrical connections of the ESP component while the ESP component remains in the transport assembly. Additionally, checking (a), (b), or (c) may include but is not limited to electrical continuity/integrity of the ESP component, isolation of an ESP component/assembly, energize and communicate with an ESP sensor or ESP motor assembly. In various embodiments, a single field service crew member can perform the testing, maintaining, or preparing described herein.

Checking the exposed end connector may further comprise placing a corresponding test connector into a workspace proximate the exposed end connector and attaching/mating the corresponding test connector to the exposed end connector to form a joint, where the workspace is unobstructed, for example having sufficient space to allow for attachment of the corresponding test connector and subsequent removal thereof by an individual. In various embodiments, the method further includes testing the joint to determine compliance with one or more operation standards, for example fit and mechanical coupling. The method may further include pressure testing the joint, for example by connecting a source of pressurized fluid to the ESP component to provide a pressurized ESP component and monitoring the joint for a release of fluid from the joint, monitoring the pressurized ESP component for a decrease in pressure, or both.

Testing of an ESP component while still being secured in the transport assembly is very beneficial in terms of time and manpower required. Testing the components can include rotating an internal component of the ESP component while the ESP component remains in the transport assembly, for example in a horizontal position relative to a surface of the Earth. It may also include removing an end cap of the ESP component to expose an attachment point of the ESP component prior to rotating the internal component. In various embodiments and with reference to FIG. 3C, a rotational or torque adapter can be coupled to the attachment point of the ESP component prior to rotating the internal component. A torque tool such as a lever or powered (e.g., electric or hydraulic) wrench can then be coupled to the rotational or torque adapter. The method may further comprise actuating the torque tool to rotate the internal component of the ESP component while the ESP component remains in the transport assembly. In various embodiments, prior to removing the end cap of the ESP component, an end plate may be removed from the transport assembly to provide additional workspace adjacent the end cap. The additional workspace can facilitate removing the end cap of the ESP component to expose the attachment point, coupling the rotational adapter to the attachment point, coupling the torque tool to the rotational adapter, actuating the torque tool to rotate the internal component of the ESP component, or any combination thereof. The additional workspace provides for unobstructed access to the end cap or attachment point. For example, and in various embodiments, the unobstructed access comprises equal to our greater than 1, 2, 3, 4, 5, 6, 7, 8, 9, or 10 cubic feet of space proximate (e.g. coaxial) with the end cap or attachment point.

In various embodiments, the testing, maintaining, or preparing described above comprises checking, sampling, or flushing oil of the ESP component. The testing or maintaining can be performed while the transport assembly is in a horizontal or inclined position. At times, the testing, maintaining, or preparing may result in oil leaking into the tray, such as when an end cap of the ESP component is removed to provide an exposed end of the ESP component. In various embodiments, a drain pan portion of the tray can catch leaked oil from the exposed end of the ESP component prior to the leaked oil contacting the environment. The drain pan portion of the transport assembly can be located adjacent an end of the transport assembly opposite an end of the transport assembly comprising a lift assembly configured to support the transport assembly in an inclined position. A drain plug can be removed from the drain pan portion of the transport assembly to provide an open drain for draining the leaked oil from the drain pan via the open drain, for example into a container for disposal or recycle. In other embodiments, prior to or after removing the end cap, the method comprises actuating the lift assembly to place the transport assembly in the inclined position.

In various embodiments and as discussed above, preparation of the ESP component can include placing lifting clamps on the ESP component and completing the preparation to run in hole while in the transportation assembly. The transport assembly is moved to the wellsite and then the ESP component can be lifted direct from the transport assembly to a well. Preparing the ESP component by affixing the lifting clamps to the ESP component while still in the transport basket eliminates one or more steps from a conventional method of placing the components into operation.

By reducing the number of times the ESP components are lifted in an unsecured manner, the exemplary method reduces the potential for bending and damaging the ESP components.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values.

Furthermore, the words "comprising" (and any form of comprising, such as "comprise" and "comprises"), "having" (and any form of having, such as "has" and "have"), "including" (and any form of including, such as "includes" and "include") or "containing" (and any form of containing, such as "contains" and "contain") are to be understood as inclusive or open-ended and do not exclude additional, unrecited elements or method steps. The term "e.g." is to be understood as an abbreviation of the term "for example"; similarly, the term "i.e." is to be understood as an abbreviation of the term "that is." The term "some" is to be understood to mean "one or more"; the term "some" includes "all." The term "coupled" is to be understood to include any connection between two things, including and without limitation a physical connection (including and without limitation a wired connection), a non-physical connection (including and without limitation a wireless connection), or any combination thereof. The terms "fluid" and "fluids" are to be understood as including any form of liquid, gas, or supercritical fluid. As used herein, the term "at least one of" is synonymous with "one or more of". For example, the phrase "at least one of A, B, and C" means any one of A, B, and C, or any combination of any two or more of A, B, and C. For example, "at least one of A, B, and C" includes one or more of A alone; or one or more of B alone; or one or more of C alone; or one or more of A and one or more of B; or one or more of A and one or more of C; or one or more of B and one or more of C; or one or more of all of A, B, and C. Similarly, as used herein, the term "at least two of" is synonymous with "two or more of". For example, the phrase "at least two of D, E, and F" means any combination of any two or more of D, E, and F. For example, "at least two of D, E, and F" includes one or more of D and one or more of E; or one or more of D and one or more of F; or one or more of E and one or more of F; or one or more of all of D, E, and F. The terms in the claims have their plain, ordinary meaning unless otherwise explicitly and clearly defined by the patentee.

What is claimed is:

1. An electrical submersible pump (ESP) transport assembly, comprising:
   at least one ESP component;
   a transport basket comprising:
     a tray having a bottom, two end walls, and two lengthwise side walls;
     multiple clamps positioned along a length of the tray, wherein the multiple clamps are configured to secure the at least one ESP component in the transport basket;
     a plurality of upper braces connected to the two lengthwise side walls of the tray; and
     at least two lift supports connected to an underside of the bottom of the tray,
   wherein the transport assembly is configured to be stacked on a second transport assembly, wherein the at least two lift supports of the transport assembly connect to upper braces of the second transport assembly.

2. The transport assembly of claim 1, wherein the at least one ESP component comprises one of a motor, a pump, a fluid inlet, a fluid outlet, a seal, a gas separator, a sensor, or any combination thereof.

3. The transport assembly of claim 1, wherein the two end walls of the tray are removable to allow access to the at least one ESP component.

4. The transport assembly of claim 1, wherein each clamp of the multiple clamps comprises a bottom component and a top component.

5. The transport assembly of claim 1, wherein the two lengthwise side walls of the tray extend from the bottom of the tray a height no higher than a mid-point of the at least one ESP component in a clamped position.

6. The transport assembly of claim 1, further comprising a vertical bracing structure at each corner of the transport basket.

7. The transport assembly of claim 1, wherein the bottom of the tray further comprises a drain hole and a drain plug.

8. The transport assembly of claim 7, wherein the transport basket further comprises:
   a rotatable support at a first end of the transport basket, wherein the drain hole is located at a second end of the transport basket opposite the first end, wherein the rotatable support can be lowered into an extended position in order to elevate the first end of the ESP transport assembly, such that the first end is elevated relative to the second end; and
   at least one angled support connected to an underside of the bottom of the tray at the second end.

9. An electrical submersible pump (ESP) transport assembly, comprising:
   at least one ESP component;
   a transport basket comprising:
     a tray having a bottom, two end walls, and two lengthwise side walls, wherein the bottom of the tray further comprises a drain hole and a drain plug;
     multiple clamps positioned along a length of the tray, wherein the multiple clamps are configured to secure the at least one ESP component in the transport basket;
     a plurality of upper braces connected to the two lengthwise side walls of the tray;
     at least two lift supports connected to an underside of the bottom of the tray;
     a rotatable support at a first end of the transport basket, wherein the drain hole is located at a second end of the transport basket opposite the first end, wherein the rotatable support can be lowered into an extended position in order to elevate the first end of the ESP transport assembly, such that the first end is elevated relative to the second end; and at least one angled support connected to an underside of the bottom of the tray at the second end.

10. The transport assembly of claim 9, wherein the at least one ESP component comprises one of a motor, a pump, a fluid inlet, a fluid outlet, a seal, a gas separator, a sensor, or any combination thereof.

11. The transport assembly of claim 9, wherein the two end walls of the tray are removable to allow access to the at least one ESP component.

12. The transport assembly of claim 9, wherein each clamp of the multiple clamps comprises a bottom component and a top component.

13. The transport assembly of claim 9, wherein the two lengthwise side walls of the tray extend from the bottom of the tray a height no higher than a mid-point of the at least one ESP component in a clamped position.

14. The transport assembly of claim 9, further comprising a vertical bracing structure at each corner of the transport basket.

15. An electrical submersible pump (ESP) transport assembly, comprising:
a first ESP component and a second ESP component;
a first transport basket comprising:
  a tray having a bottom, two end walls, and two lengthwise side walls;
  multiple clamps positioned along a length of the tray, wherein the multiple clamps are configured to secure the at least one ESP component in the transport basket;
  a plurality of upper braces connected to the two lengthwise side walls of the tray; and
  at least two lift supports connected to an underside of the bottom of the tray; and
a second transport basket comprising:
  a tray having a bottom, two end walls, and two lengthwise side walls;
  multiple clamps positioned along a length of the tray, wherein the multiple clamps are configured to secure the at least one ESP component in the transport basket;
  a plurality of upper braces connected to the two lengthwise side walls of the tray; and
  at least two lift supports connected to an underside of the bottom of the tray,
wherein the first ESP component is supported by the first transport basket,
wherein the second ESP component is supported by the second transport basket;
wherein the first transport assembly is stacked on the second transport assembly, and
wherein the at least two lift supports of the first transport assembly connect to the upper braces of the second transport assembly.

16. The transport assembly of claim 15, wherein the first ESP component comprises one of a motor, a pump, a fluid inlet, a fluid outlet, a seal, a gas separator, a sensor, or any combination thereof and wherein the second ESP component comprises one of a motor, a pump, a fluid inlet, a fluid outlet, a seal, a gas separator, a sensor, or any combination thereof.

17. The transport assembly of claim 15, wherein the two end walls of the tray of the first transport basket are removable to allow access to the first ESP component and wherein the two end walls of the tray of the second transport basket are removable to allow access to the second ESP component.

18. The transport assembly of claim 15, wherein each clamp of the multiple clamps of the first transport basket comprises a bottom component and a top component and wherein each clamp of the multiple clamps of the second transport basket comprises a bottom component and a top component.

19. The transport assembly of claim 15, wherein the two lengthwise side walls of the tray of the first transport basket extend from the bottom of the tray a height no higher than a mid-point of the first ESP component in a clamped position and wherein the two lengthwise side walls of the tray of the second transport basket extend from the bottom of the tray a height no higher than a mid-point of the second ESP component in a clamped position.

20. The transport assembly of claim 15, further comprising a vertical bracing structure at each corner of the first transport basket and a vertical bracing structure at each corner of the second transport basket.

* * * * *